J. S. TADLOCK.
Horse-Powers.
No. 144,040.         Patented Oct. 28, 1873.
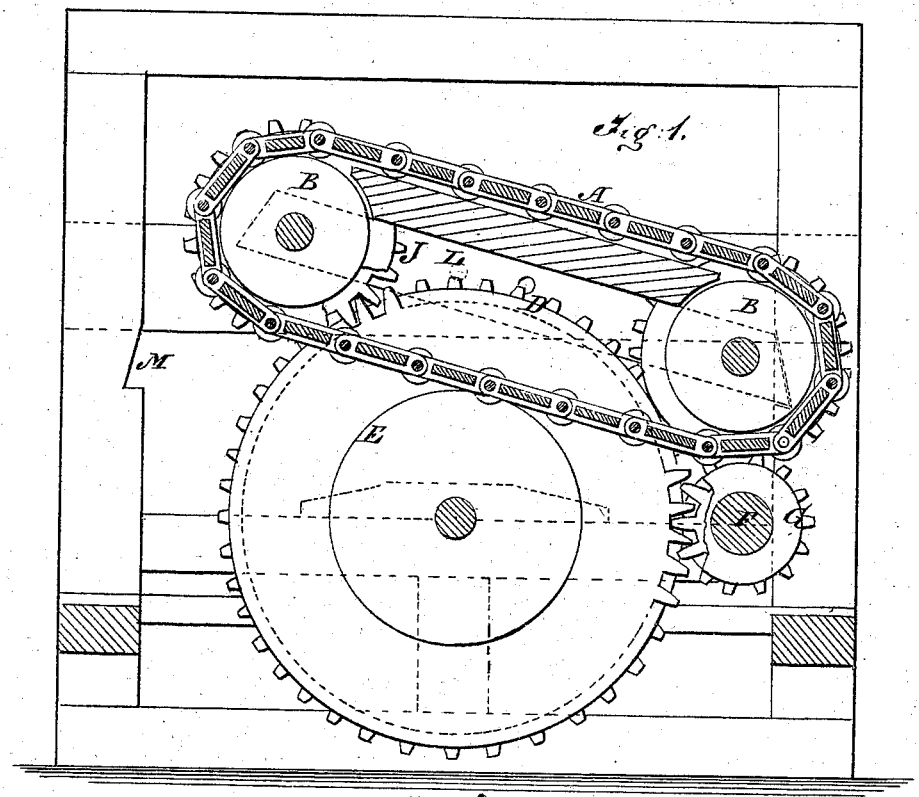
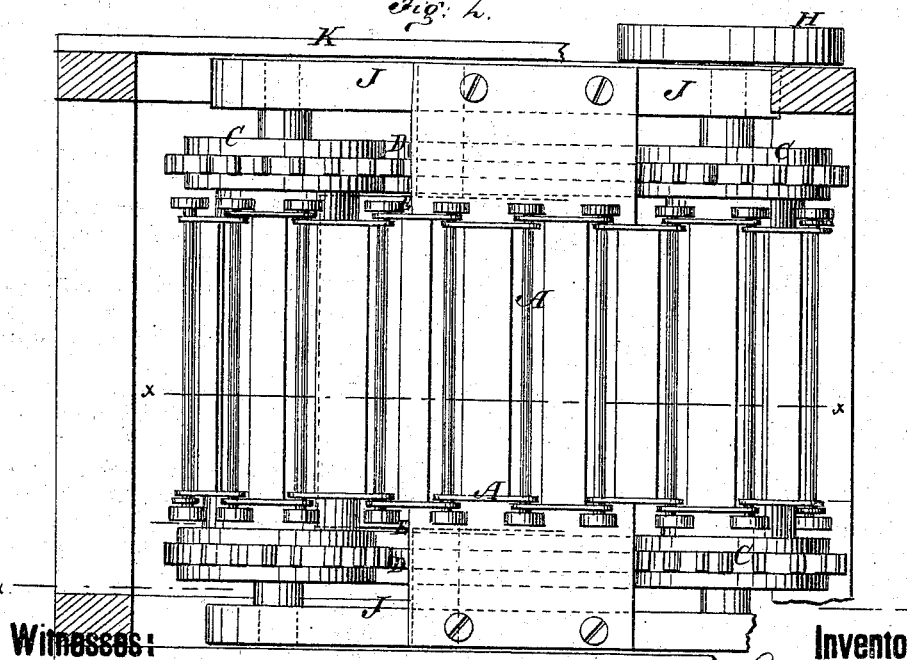
Witnesses:
Inventor:

UNITED STATES PATENT OFFICE.

JOHN S. TADLOCK, OF BELMONT, TEXAS, ASSIGNOR TO HIMSELF AND J. M. HOWELL, OF SAME PLACE.

IMPROVEMENT IN HORSE-POWERS.

Specification forming part of Letters Patent No. 144,040, dated October 28, 1873; application filed August 16, 1873.

*To all whom it may concern:*

Be it known that I, JOHN S. TADLOCK, of Belmont, in the county of Gonzales and State of Texas, have invented a new and Improved Horse-Power, of which the following is a specification:

My invention relates to railway horse-powers; and it consists of cog-wheels on the drums over which the endless chain travels, gearing with large multiplying-wheels, one on each side of the chain, between which said wheels is a drum on the same shaft, on which the chain rests, so as to be carried in returning to the upper side, and the multiplying-wheels are geared with a counter-shaft having pinions and transmitting-pulleys, from which the motion is taken by belts. The frame supporting the endless chain rests by the wheels of its drums on the large multiplying-wheels, and can be shifted so as to ascend from either side to run the machine in either direction, and to change the inclination for varying the speed. The drums of the endless chain are weighted to prevent them from jumping out of gear with the multiplying-wheels.

Figure 1 is a longitudinal sectional elevation of my improved horse-power taken on the line $x\ x$ of Fig. 2. Fig. 2 is a plan view.

Similar letters of reference indicate corresponding parts.

A represents the endless chain; B, the drums on which it runs. C, the wheels of the said drums; D, the large multiplying-wheels, on which the chain-drum wheels rest; E, the drum between the wheels D; F, the counter-shaft gearing with the wheels E by pinions G. H H are the transmitting-pulleys. The drums B are connected to a frame, J, making a kind of truck, which rests on the large wheels, being confined laterally by the bars K of the stationary frame, and longitudinally by pins L and said bars K, by which it is connected, so as to vary the inclination according to the speed wanted. For the greatest inclination the frame will rest at one or the other of its ends in the notches M in the stationary frame. The wheels of the drums B have their faces constructed to roll on the faces of the multiplying-wheels, besides gearing with them, so that the friction is mainly on the journals of the wheels D, and is consequently much less than it would be if the drums were mounted in fixed bearings, and the wheels D not used. The drums B are made hollow and filled with sand, gravel, or other heavy matters, to cause them to keep their positions. The endless chain rolls on the top of the drum E in returning to the upper drum, and is held up level, or nearly so, to prevent straining the journals of the drums, also to utilize whatever friction there may be by the contact for turning the drum by the chain.

It is not essential that the wheels of both of the drums be toothed, but it is probably better to have them so. The drum E may be dispensed with, but I prefer to use it.

Having thus described my invention, I claim as new and desire to secure by Letters Patent—

1. The combination of the endless chain A, drums B, wheels C and D, and the pinion-wheels G, shaft F, and pulleys H, substantially as specified.

2. The combination of the drum E with the wheels D and chain A, substantially as specified.

3. The endless chain A, drums B, and wheels C, combined in a truck, and arranged for shifting from side to side, and to different inclinations on the wheels D, substantially as specified.

JOHN S. TADLOCK.

Witnesses:
S. H. WALDIE,
I. G. HARGRAVE.